US012638757B2

(12) United States Patent
Ogawa

(10) Patent No.: US 12,638,757 B2
(45) Date of Patent: May 26, 2026

(54) ELECTRONIC EQUIPMENT AND ELECTRONIC EQUIPMENT FABRICATION METHOD

(71) Applicant: CASIO COMPUTER CO., LTD., Tokyo (JP)

(72) Inventor: Kyosuke Ogawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 380 days.

(21) Appl. No.: 18/211,872

(22) Filed: Jun. 20, 2023

(65) Prior Publication Data

US 2023/0408893 A1 Dec. 21, 2023

(30) Foreign Application Priority Data

Jun. 21, 2022 (JP) .................................. 2022-099301

(51) Int. Cl.
*G03B 21/14* (2006.01)
*H04N 5/74* (2006.01)
(52) U.S. Cl.
CPC ......... *G03B 21/145* (2013.01); *H04N 5/7475* (2013.01)
(58) Field of Classification Search
CPC ...... G03B 21/00; G03B 21/14; G03B 21/142; G03B 21/145; H04N 5/74; H04N 5/77; H04N 5/7475; H04N 9/31; H04N 9/3105; H04N 9/3141
See application file for complete search history.

(56) References Cited

U.S. PATENT DOCUMENTS

| | | | | | |
|---|---|---|---|---|---|
| 2005/0077308 | A1* | 4/2005 | Ishii | ..................... | G03B 21/145 |
| | | | | | 220/830 |
| 2009/0051829 | A1* | 2/2009 | Nagahata | ............. | G03B 21/145 |
| | | | | | 348/789 |
| 2012/0242966 | A1* | 9/2012 | Saito | ................... | G03B 21/145 |
| | | | | | 353/100 |
| 2014/0354964 | A1* | 12/2014 | Ogawa | .................. | F16M 11/04 |
| | | | | | 353/121 |

FOREIGN PATENT DOCUMENTS

| | | |
|---|---|---|
| JP | 2001-334985 A | 12/2001 |
| JP | 2009-287522 A | 12/2009 |
| JP | 2011-094662 A | 5/2011 |
| JP | 2017-035017 A | 2/2017 |
| JP | 2018-017964 A | 2/2018 |
| JP | 2020-058475 A | 4/2020 |

* cited by examiner

*Primary Examiner* — Sultan Chowdhury
(74) *Attorney, Agent, or Firm* — Fitch, Even, Tabin & Flannery LLP

(57) ABSTRACT

There is provided electronic equipment including a first case, a second case provided with an internal part disposed between the first case and the second case, and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, and wherein the first boss is fixed to the second case.

11 Claims, 14 Drawing Sheets

ELECTRONIC EQUIPMENT AND ELECTRONIC EQUIPMENT FABRICATION METHOD

CROSS-REFERENCE TO RELATED APPLICATIONS

This patent application is based upon and claims the benefit of priority under 35 USC 119 to Japanese Patent Application No. 2022-099301 filed on Jun. 21, 2022, the entire disclosure of which, including the specification, claims, drawings, and abstract, is incorporated herein by reference.

BACKGROUND OF THE INVENTION

Technical Field

The present disclosure relates to electronic equipment and an electronic equipment fabrication method.

Description of the Related Art

There has conventionally been known electronic equipment in which internal parts are disposed between an upper case and a lower case, and one case of the upper case and the lower case is fixed to bosses extending from an inner surface side of the other case. For example, Japanese Unexamined Patent Application Publication No. 2018-17964 (JP-A-2018-17964) discloses a projector (electronic equipment) including an exterior case having an upper case and a lower case, wherein the upper case and the lower case are assembled together in such a manner as to hold a projector main body vertically therebetween. In this projector, circular cylindrical bosses project from the inner surface side of the lower case, so that screws are screwed into corresponding hole portions provided in the bosses from a bottom surface side, whereby the upper case and the lower case are fastened together.

SUMMARY

According to an aspect of the present disclosure, there is provided electronic equipment including a first case, a second case provided with an internal part disposed between the first case and the second case, and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, and wherein the first boss is fixed to the second case.

According to another aspect of the present disclosure, there is provided an electronic equipment fabrication method including mounting an internal part configured to be disposed between a first case and a second case in the second case, bringing a side panel into engagement with the second case in such a state that the side panel is erected around the internal part, superposing the first case on the side panel while bosses on the first case are being passed through guides on the side panel, and fastening the bosses, the second case, and the side panel all together with a fastener.

DESCRIPTION OF THE EMBODIMENT

Figure 1:
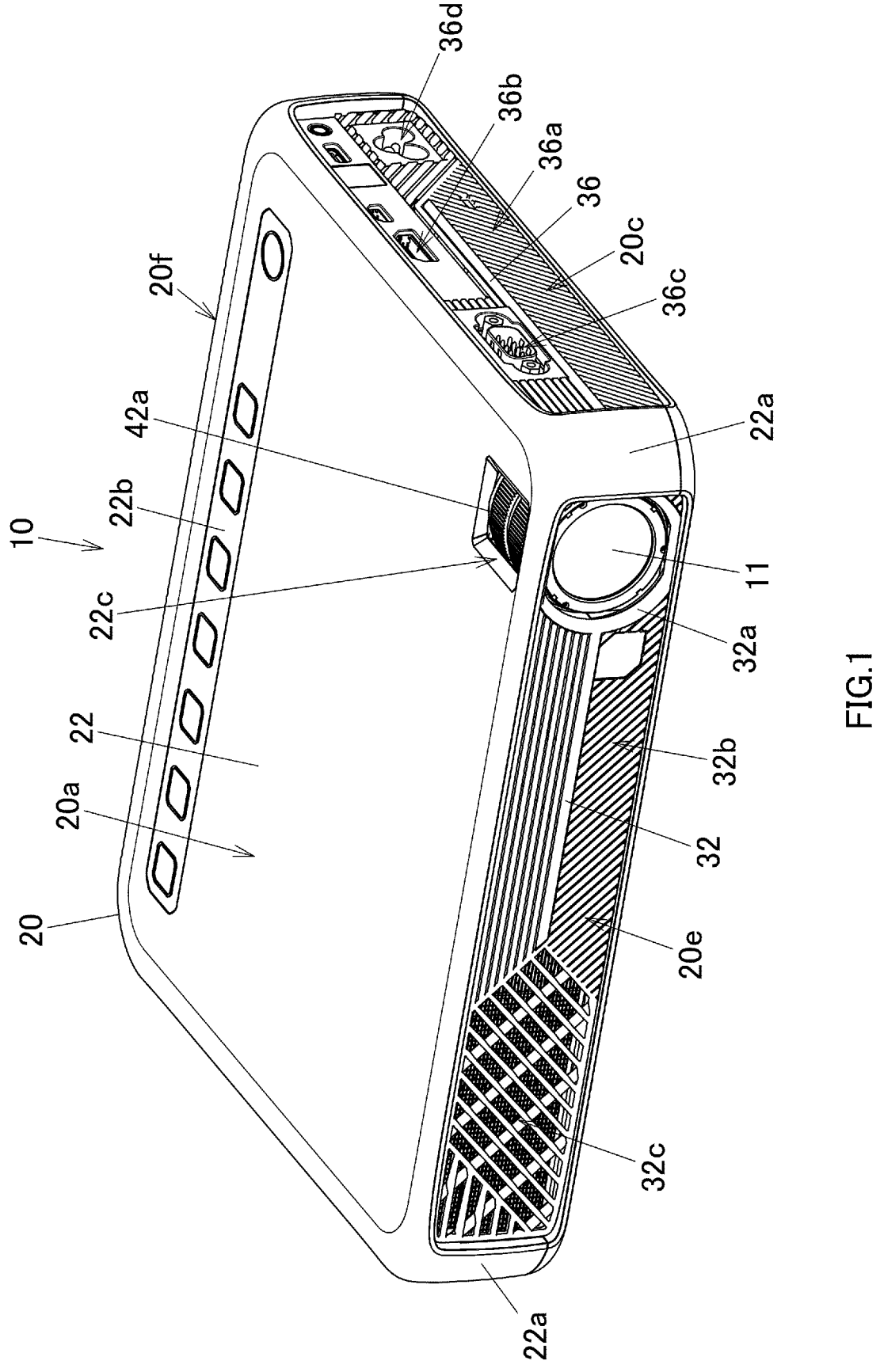
FIG. 1 is a perspective view of a projector according to an embodiment as viewed from a front upper side.
Figure 2:
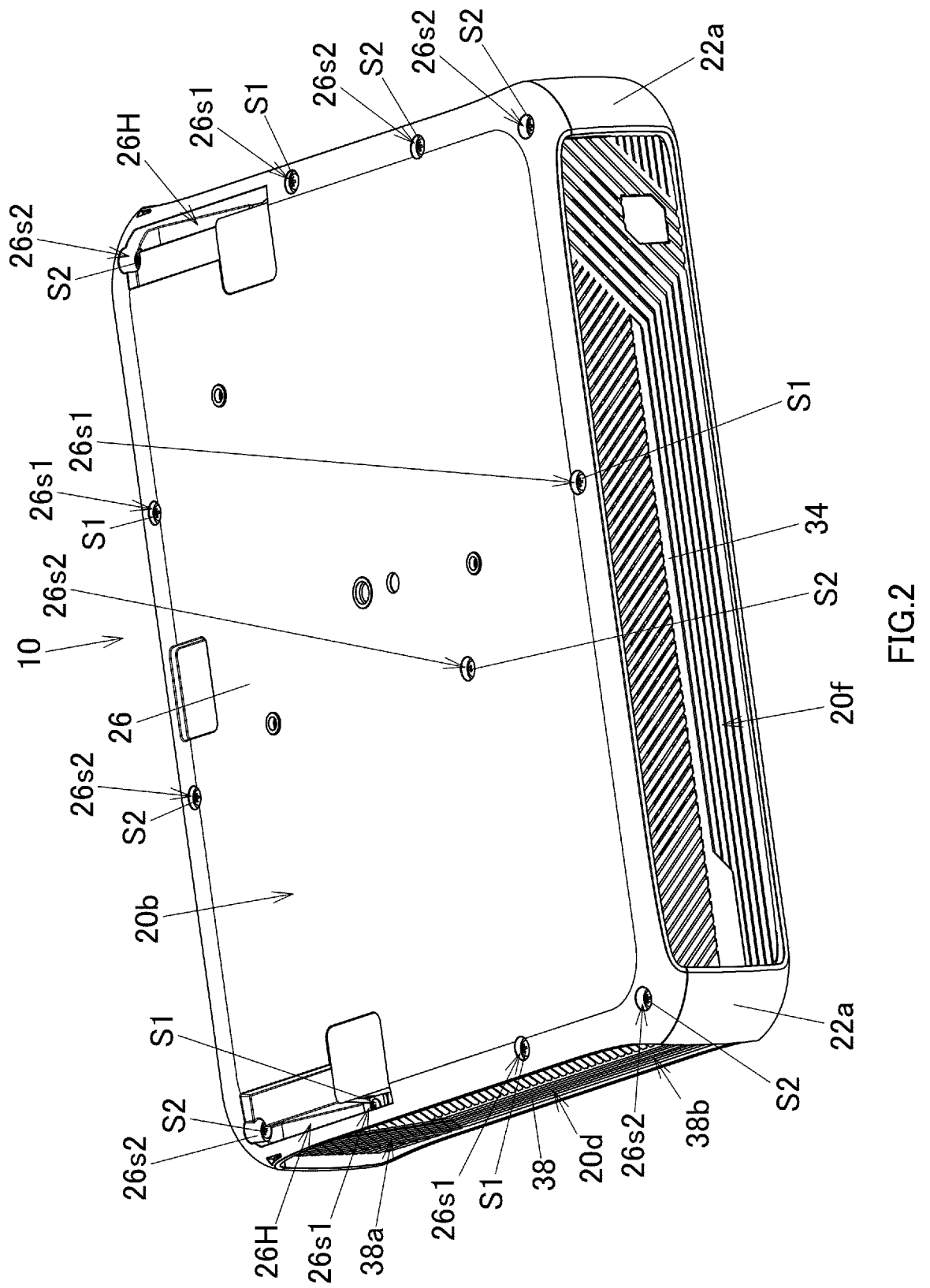
FIG. 2 is a perspective view of the projector according to the embodiment as viewed from a rear lower side.

Hereinafter, referring to drawings, an embodiment of the present disclosure will be described. As shown in FIGS. 1 and 2, a projector (electronic equipment) 10 according to the embodiment includes a case 20, which is formed substantially into a rectangular parallelepiped box shape whose longitudinal direction follows a left-right direction and which has six sides or surfaces (an upper surface 20a, a lower surface 20b, a left-hand side surface 20c, a right-hand side surface 20d, a front surface 20e, a rear surface 20f). The projector 10 has a projection port 11 in the front surface 20e, and projected light is emitted from this projection port 11. In the following description, the left and right of the projector 10 denote a left-right direction with respect to an emitting direction in which projected light is emitted from the projection port 11, and the front and rear of the projector 10 denote a front-rear direction with respect to a traveling direction of projected light of the projector 10. Additionally, a side of the projector 10 which corresponds to the upper surface 20a thereof is referred to as an upper side, and a side corresponding to the lower surface 20b thereof is referred to as a lower side of the projector 10.

The case 20 has an upper case (also, referred to as a first upper case or a first cover) 22 including the upper surface 20a and four corners, a lower case (also, referred to as a second case or a second cover) 24 (refer to FIG. 3 and the like), and a bottom cover (a cover) 26 including the lower surface 20b. In an interior of the case 20, an internal part IP (refer to FIG. 6) making up the projector 10 is disposed between the upper case 22 and the lower case 24. That is, the upper case 22, the internal part IP, and the lower case 24 are aligned in an up-down direction (an alignment direction). The bottom cover 26 covers substantially a whole area of the lower case 24 from an external side (an opposite side to a side where the internal part IP is disposed). A cover-side hinge attachment portion 26H to which a tilt hinge mechanism of the projector 10 is attached is provided on both left- and right-hand sides of a front portion of the bottom cover 26.

The case 20 has a front panel (a side panel) 32 including the front surface 20e on a front side, a rear panel (a side panel) 34 including the rear surface 20f on a rear side, a left-hand side panel (a side panel) 36 including the left-hand surface 20c on a left-hand side, and a right-hand side panel (a side panel) 38 including the right-hand side surface 20d on a right-hand side thereof. In the component parts making up the case 20, the lower case 22 is made of metal, and the other component parts are made from resin.

The upper case 22 has case corners 22a making up the four corners of the case 20. Each case corner 22a is formed into a rounded corner, and a distal end portion (a lower end portion) of the case corner 22a is brought into abutment with the bottom cover 26. A control panel 22b is provided on the upper surface 20a of the upper case 22, and this control panel 22b includes a group of buttons with which the projector 10 can be set variously. A substantially rectangular adjustment opening 22c is provided at a front left corner of the upper surface 20a of the upper case 22. A movable adjustment ring 42a, which is provided in a lens barrel 42 (refer to FIG. 6) accommodated inside the case 20, is exposed from an opening of the adjustment opening 22c.

The individual panels 32, 34, 36, 38 which make up the side surfaces of the case 20 are a rectangular panel-shaped component part, and as will be described later, an upper edge (one edge in a transverse direction) is brought into engagement with the upper case 22, while a lower edge (the other edge in the transverse direction) is brought into engagement with the lower case 24. Both longitudinal ends of the individual panels 32, 34, 36, 38 are brought into abutment with internal sides of the corresponding case corners 22a. A projection port opening 32a from which the projection port 11 of the lens barrel 42 is exposed, a first outside air inlet port 32b, and an inside air outlet port 32c are provided in the front panel 32. A second outside air inlet port 36a, an image input connector connection port 36b, an external control serial connector connection port 36c, a power supply plug connection port 36d, and the like are provided in the left-hand side panel 36. A third outside air inlet port 38a and a fourth outside air inlet port 38b are provided in the right-hand side panel 38.

Figure 6:
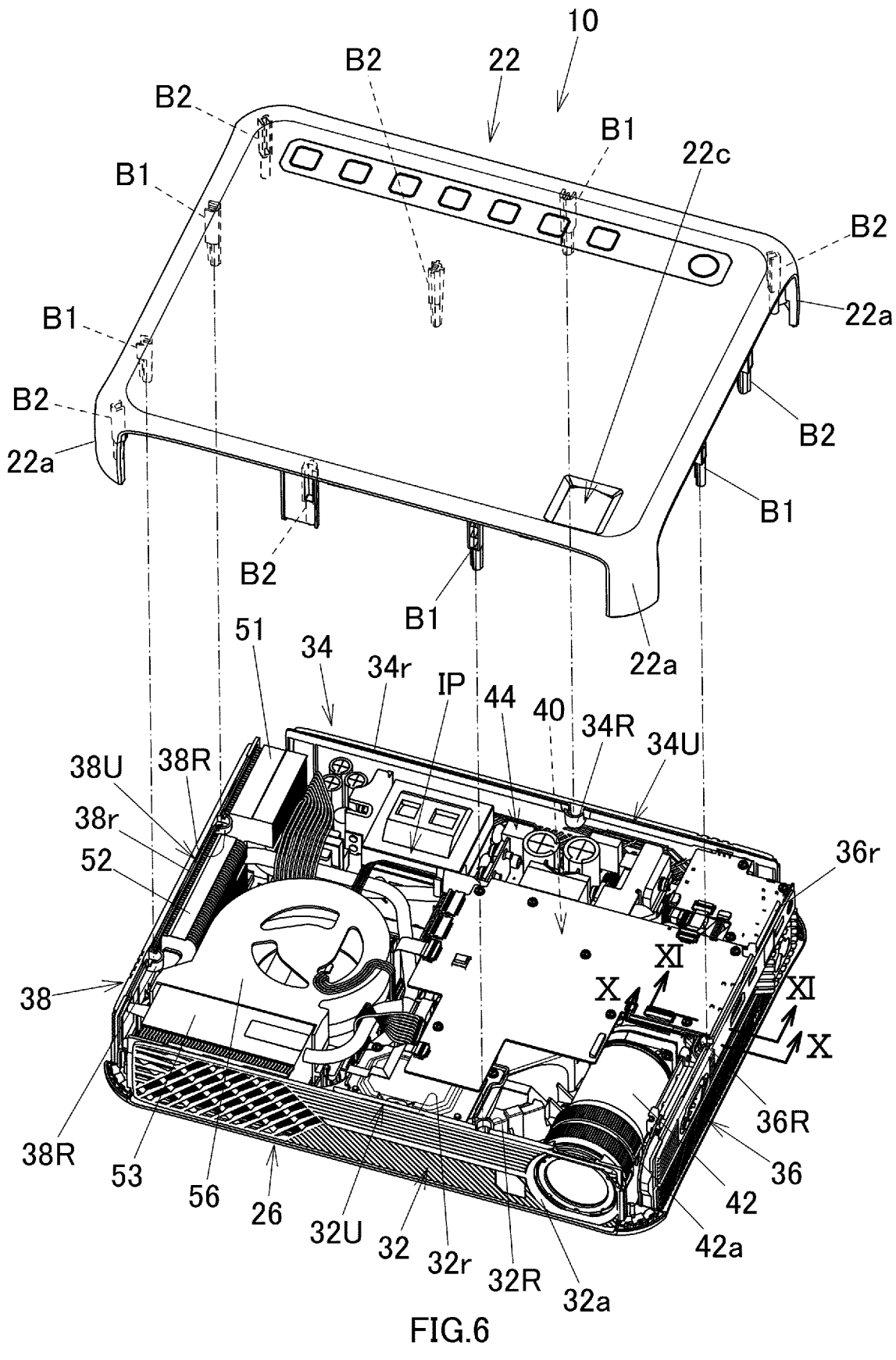
FIG. 6 is a perspective view of the projector according to the embodiment as viewed from the front upper side with the upper case disassembled from the projector.

Here, referring to FIG. 6, the internal part IP accommodated inside the case 20 of the projector 10 will be described. As shown in FIG. 6, the internal part IP of the projector 10 includes a light source apparatus 40 covered with a projection cover at a portion which lies substantially central in the transverse direction and closer to the left-hand side in the longitudinal direction of the case 20 and also includes the lens barrel 42 disposed near the front left corner of the case 20. A control circuit board 44, in which a control unit and the like of the projector 10 are mounted, is disposed at a rear portion of the case 20 as the internal part IP. In addition, the projector 10 includes a first cooling device 51 on a right-hand side of the control circuit board 44 as the internal part IP and also includes a second cooling device 52 and a third cooling device 53 which are disposed in portions closer to the right-hand side and the front side of the case 20, respectively. Heat pipes are disposed between the light source apparatus 40 and the individual cooling devices 51, 52, 53. In addition, the projector 10 further includes a cooling fan 56 at a portion (a right-hand side portion of the case 20) which is surrounded by the light source apparatus 40, the control circuit board 44, the second cooling device 52, and the third cooling device 53.

Figure 7:
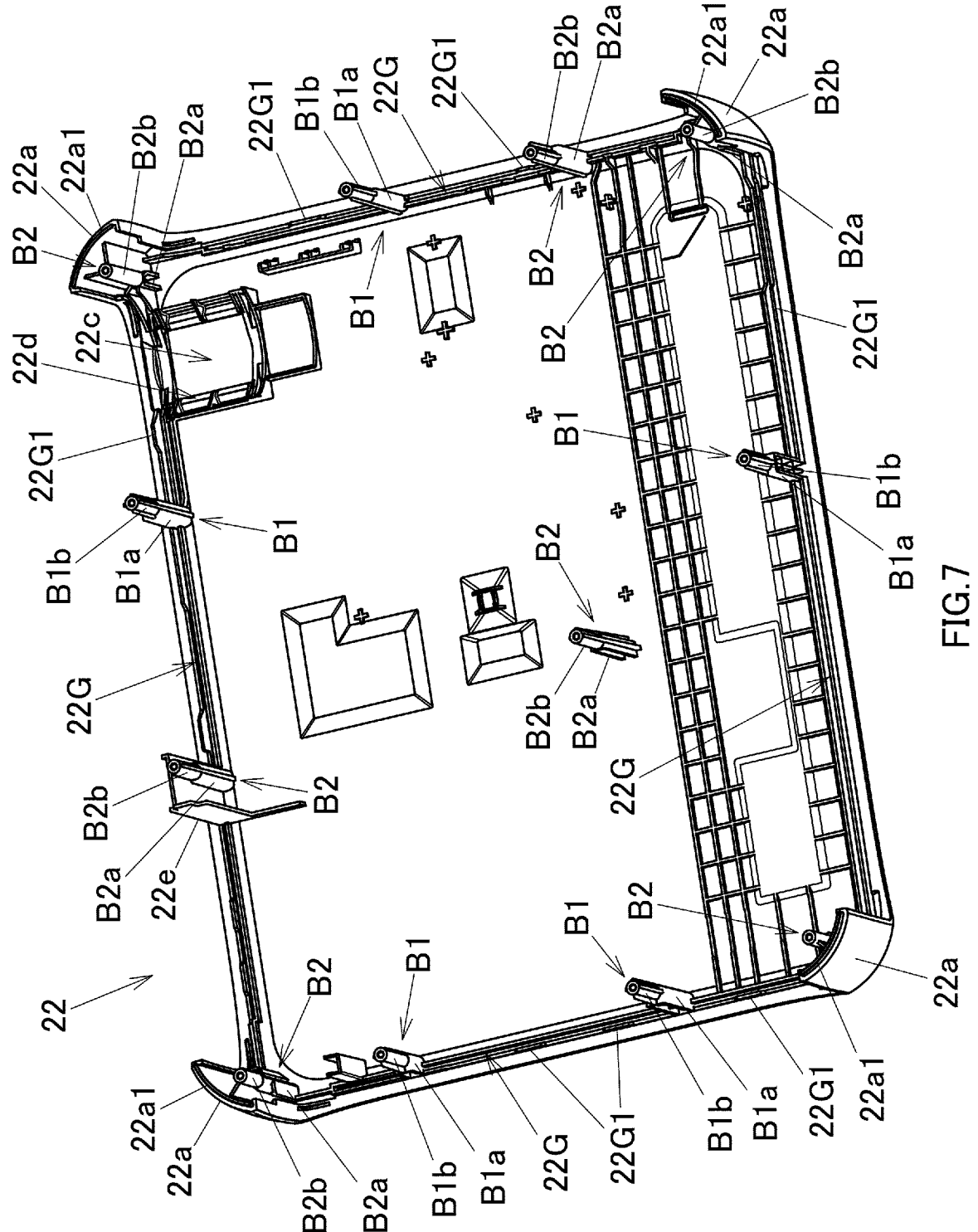
FIG. 7 is a perspective view of the upper case of the projector according to the embodiment as viewed from the front upper side.

Next, configurations of the component parts making up the case 20 will be described in detail. Firstly, referring to FIGS. 3, 6 and 7, the upper case 22 will be described. Each case corner 22a of the upper case 22 has a corner stopper 22a1 at the distal end portion thereof, and this corner stopper 22a1 is reduced in thickness and projects slightly downwards (refer to FIG. 7). Each corner stopper 22a1 is brought into abutment with an internal surface of a corner receiving portion 26a of the bottom cover 26, which will be described later, on an external surface thereof. An upper lens barrel supporter 22d for supporting an upper portion of the lens barrel 42 is provided around the opening of the adjustment opening 22c on an internal surface side (a lower surface side) of the upper case 22. The upper lens barrel supporter 22d projects substantially into an arc shape along an outer circumferential surface of the lens barrel 42. A partition plate 22e is provided in a position closer to the right-hand side on a front edge portion of an outer edge portion on the internal surface side of the upper case 20 to separate the first outside air inlet port 32b from the inside air outlet port 32c of the projector 10.

The upper case 22 has plural bosses B1, B2 which extend in the up-down direction on the internal surface side (the lower surface side) thereof. Specifically speaking, the upper case 22 has five first bosses B1 which are configured to be passed through annular portions 32R, 34R, 36R, 38R, which will be described later, and seven second bosses B2 which are not passed through the annular portions 32R, 34R, 36R, 38R. The first bosses B1 are provided in a position lying closer to the left-hand side on the front edge portion of the outer edge portion of the upper case 22, a position lying closer to the left on a rear edge portion, a position slightly closer to the front on a left-hand side edge portion, and a position lying closer to the front and a position lying closer to the rear on a right-hand side edge portion one for each position.

The first boss B1 and the second boss B2 have respectively proximal portions B1a, B2a on proximal sides and distal portions B1b, B2b on distal sides thereof which extend from an internal surface of the upper case 22. The proximal portions B1a, B2a are solid, while the distal portions B1b, B2b are formed substantially into a hollow cylindrical shape and are opened downwards. Threaded holes BH (refer to FIG. 10) are formed inside the distal portions B1b, B2b which are formed substantially into the hollow cylindrical shape so that a first screw (a first fastener) S1 and a second screw (a second fastener) S2 are screwed thereinto. Additionally, in the first boss B1, a part of an outer circumferential surface of the proximal portion B1a which is passed through the annular portions 32R, 34R, 36R, 38R is formed into an arc shape (refer to FIG. 13). The part of the outer circumferential surface of the proximal portion B1*a* may also be formed substantially into an arc shape.

The first bosses B1 extend to a position where the first bosses B1 are brought into abutment with or lie close to projections 32P, 34P, 36P, 38P, which will be described later, and the second bosses B2 extend to a position where the second bosses B2 are brought into abutment with or lie close to second abutment portions 24*b*2 of the lower case 24, which will be described later. Plural reinforcement ribs, which extend rectilinearly along the up-down direction, are provided on outer circumferences of the proximal portions B1*a*, B2*a* and the distal portions Bib, B2*b*.

An upper case groove (a second engagement target portion) 22G having a groove shape is provided at the outer edge portion on the internal surface side of the upper case 22 in such a manner as to extend along the outer edge portion. The upper case groove 22G is made up of two external and internal wall-shaped portions and is provided to extend substantially along a full circumference of the internal surface side of the upper case 22 excluding portions on the outer edge portion which correspond to the portions where the first bosses B1 and the second bosses B2 are provided and the portion where the lens barrel 42 is disposed. In other words, the first bosses B1 and the second bosses B2 on the outer edge portion are connected integrally with the upper case groove 22G. In the present embodiment, the substantially full circumference is exemplified by the configuration in which the upper case groove 22G is provided along the full circumferential area of the internal surface side of the upper case 22 excluding the portions where the bosses and the lens barrel are disposed as described above; however, the substantially full circumference also includes a configuration in which the upper case groove 22G is provided over a whole area along the full circumference of the internal surface side of the upper case 22. In addition, an upper case projection (a fitting target) 22G1, which is made to project towards a lower side, is provided at portions or plural locations on the external wall-shaped portion of the two wall-shaped portions which make up the upper case groove 22G.

Figure 4:
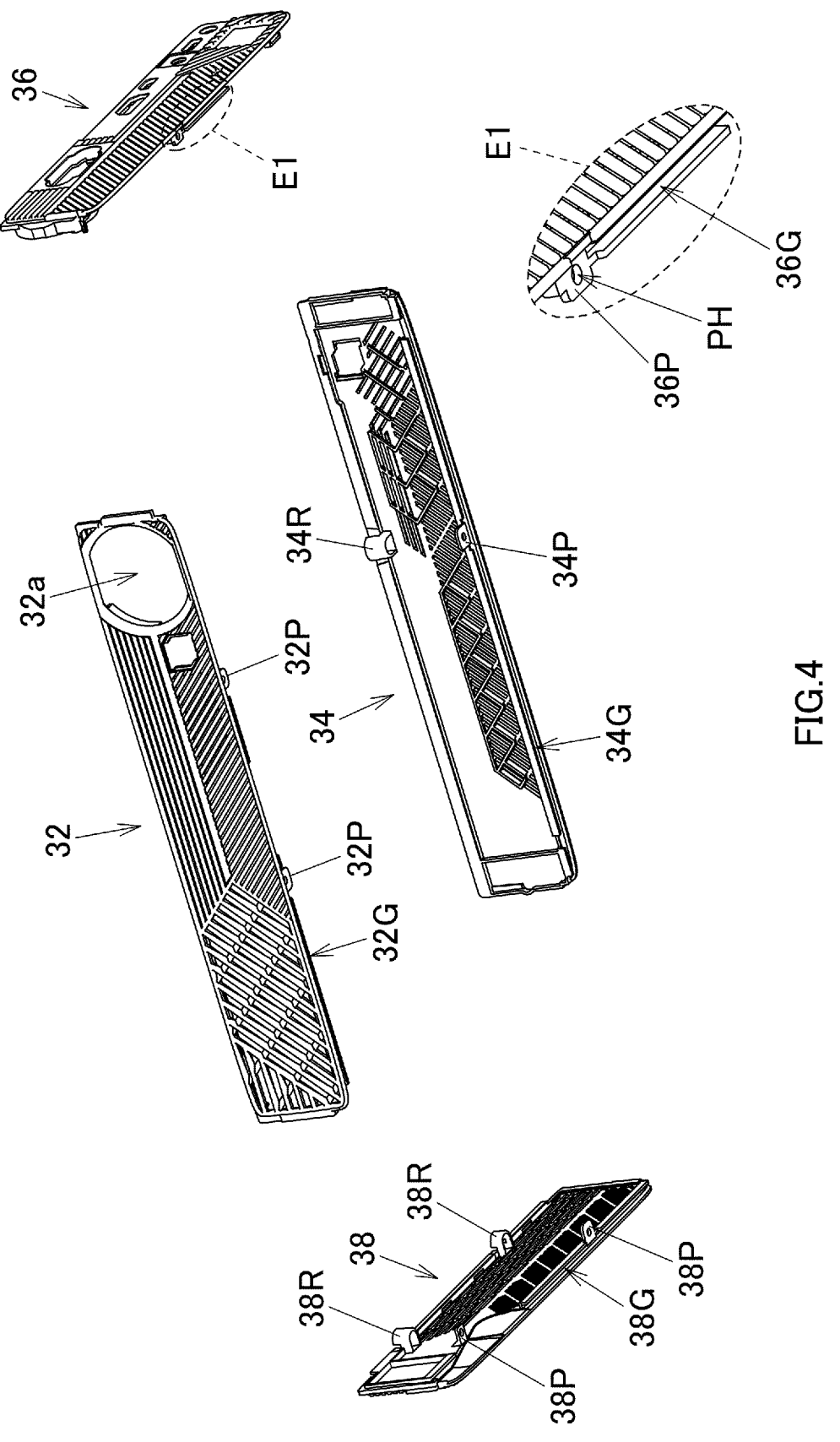
FIG. 4 is an exploded perspective view of a front panel, a rear panel, a left panel, and a right panel which make up a case of the projector according to the embodiment as viewed from a front lower side, and E1 denotes an enlarged perspective view of a part of a lower end portion of the left panel.

Next, referring to FIGS. 4, 5, and 6, the panels 32, 34, 36, 38 which make up the side surfaces of the case 20 will be described. The annular portions (the guides) 32R, 34R, 36R, 38R are provided partially in positions lying close to upper end portions of the panels 32, 34, 36, 38 respectively in such a manner as to protrude convexly inwards (towards the internal part IP) to form substantially an annular shape and to be opened to penetrate in the up-down direction. At least a part of the annular portions (the guides) 32R, 34R, 36R, 38R has an arc shape. In the present description, the substantially annular shape includes not only an annular shape but also a closed shape which is formed into an arc shape partially. Specifically speaking, the annular portions 32R, 34R, 36R, 38R are provided in positions which are superposed on the first bosses B1 on the upper case 22 in the up-down direction and are given an opening diameter which enables the first boss B1 to pass therethrough. More specifically speaking, the annular portions 32R, 34R, 36R, 38R are provided at the upper end portions of the panels 32, 34, 36, 38, respectively.

The annular portions 32R, 34R, 36R, 38R are provided such that one annular portion 32R is provided on the front panel 32, one annular portion 34R is provided on the rear panel 34, one annular portion 36R is provided on the left-hand side panel 36, and two annular portions 38R are provided on the right-hand side panel 38. In this way, at least one annular portion 32R, 34R, 36R, 38R is provided on the panel 32, 34, 36, 38, respectively, in the position lying close to the upper case 22 in the up-down direction. In an interior of the projector 10, the annular portion 32R of the front panel 32 is disposed between a front portion of the light source apparatus 40 and the lens barrel 42, the annular portion 34R of the rear panel 34 is disposed in a position lying on a rear side of the control circuit board 44 and closer to the left, the annular portion 36R of the left-hand side panel 36 is disposed between a rear end portion of the lens barrel 42 and the light source apparatus 40, and the two annular portions 38R of the right-hand side panel 38 are disposed between the first cooling device 51 and the second cooling device 52 and between the second cooling device 52 and the cooling fan 56.

Panel ribs (second engagement portions) 32*r*, 34*r*, 36*r*, 38*r*, which are configured to be brought into engagement with the upper case groove 22G, are provided at the upper end portions of the panels 32, 34, 36, 38, respectively. The panel ribs 32*r*, 34*r*, 36*r*, 38*r* are provided to extend along the longitudinal directions of the panels 32, 34, 36, 38, respectively, in such a manner as to protrude inwards from the corresponding panels 32, 34, 36, 38 to rise perpendicularly into a rib shape. The panel ribs 32*r*, 34*r*, 36*r*, 38*r* are provided to extend over substantially a whole area of the upper end portions of the panels 32, 34, 36, 38 excluding the portions where the annular portions 32R, 34R, 36R, 38R are provided. In other words, the annular portions 32R, 34R, 36R, 38R are connected integrally with the corresponding panel ribs 32*r*, 34*r*, 36*r*, 38*r*.

Figure 5:
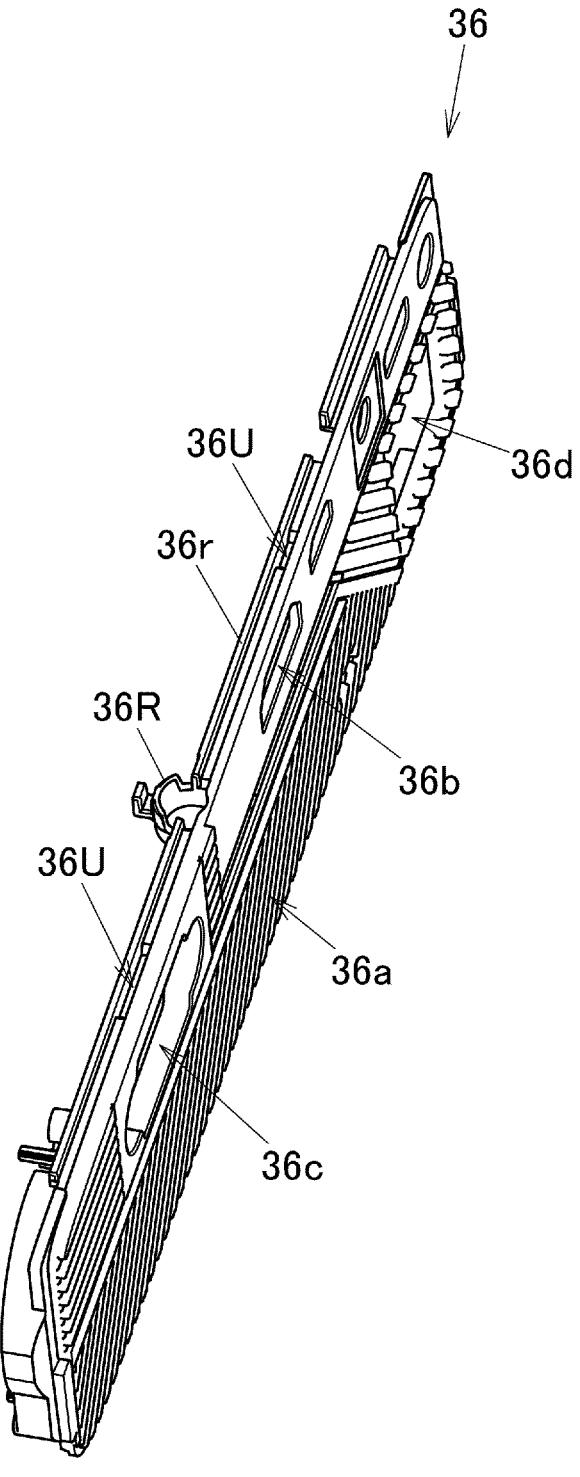
FIG. 5 is a perspective view of the left panel making up the case of the projector according to the embodiment as viewed from a front upper side.

In addition, as shown in FIG. 5, panel recessed portions (fitting portions) 36U are provided in gap positions defined between the left-hand side panel 36 and the panel rib 36*r*. These panel recessed portions 36U are formed into a recess opened upwards and are configured to fit on corresponding upper case projections 22G1 on the upper case 22. Similarly, panel recessed portions 32U, 34U, 38U are provided in the front panel 32, the rear panel 34, and the right-hand side panel 38, respectively, in positions corresponding to the gap positions defined between the left-hand side panel 36 and the panel rib 36*r* in such a manner as to fit on the corresponding upper case projections 22G1 (refer to FIG. 6).

The projections 32P, 34P, 36P, 38P are provided partially on the panels 32, 34, 36, 38, respectively, in positions lying closer to lower ends thereof. These projections 32P, 34P, 36P, 38P are formed into the shape of a plate of which both plate surfaces are oriented in the up-down direction and project inwards (towards the internal part IP). Specifically speaking, the projections 32P, 34P, 36P, 38P are provided in positions which are superposed on the first bosses B1 in the up-down direction excluding the projection 32P which is provided on the front panel 32 in a position lying closer to the right. As a result, the projections 32P, 34P, 36P, 38P which are superposed on the first bosses B1 are also superposed on the annular portions 32R, 34R, 36R, 38R in the up-down direction. Additionally, projection screw holes PH (refer to an enlarged view E1 shown in FIG. 4) are provided individually in the projections 32P, 34P, 36P, 38P so that the first screw S1 and the second screw S2 are allowed to pass therethrough. Although only the projection screw hole PH provided in the projection 36P of the left-hand side panel 36 is shown in FIG. 4, similarly, projection screw holes are also provided individually in the projections 32P, 34P, 38P of the other panels 32, 34, 38.

Figure 8:
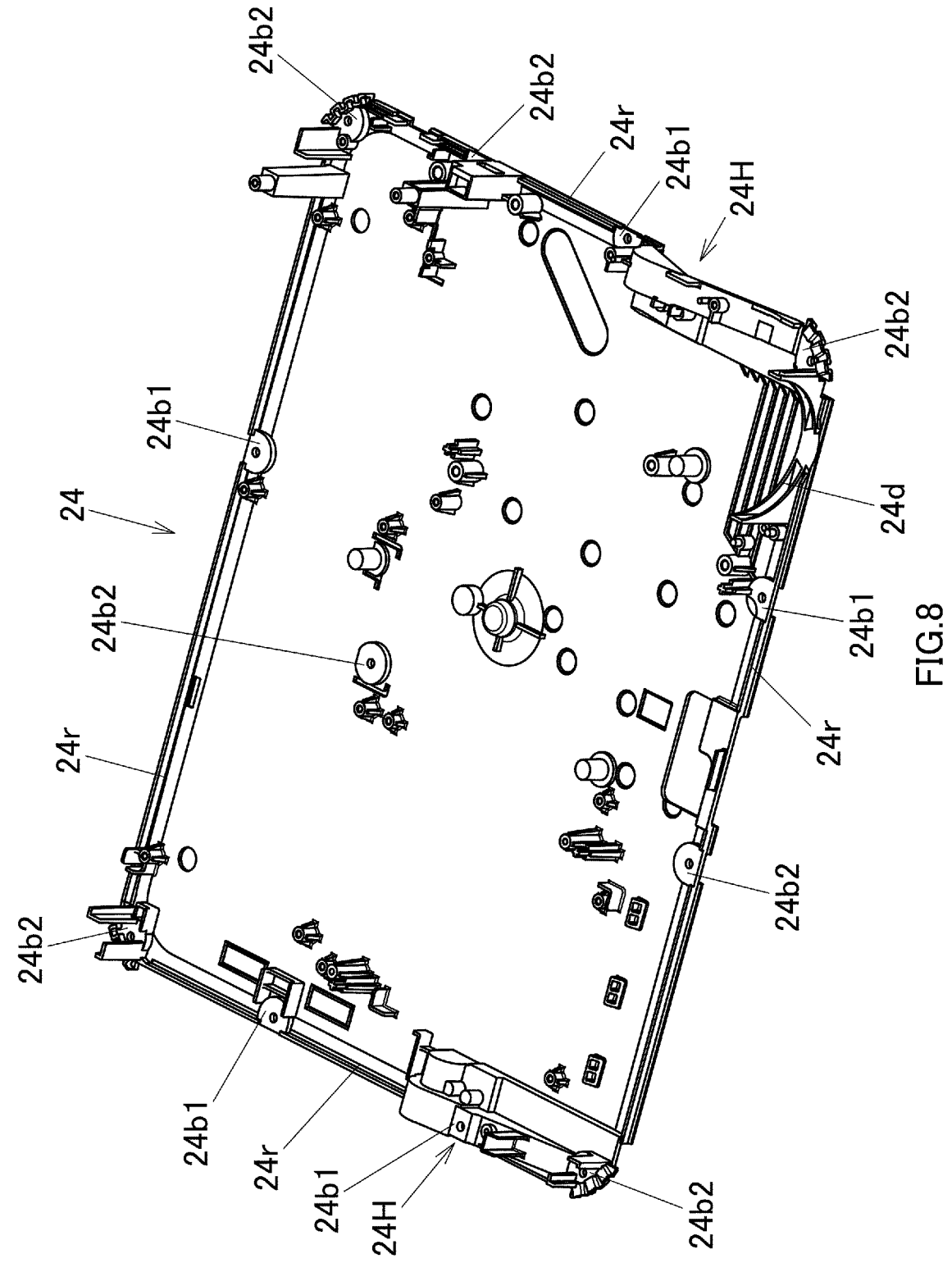
FIG. 8 is a perspective view of the lower case of the projector according to the embodiment as viewed from the front upper side.

Panel grooves (first engagement targets) 32G, 34G, 36G, 38G are provided in lower end portions of the panels 32, 34, 36, 38, respectively. These panel grooves 32G, 34G, 36G, 38G are formed into the shape of a groove which extends along the longitudinal direction of the panels 32, 34, 36, 38 and are configured to be brought into engagement with a lower case rib 24*r*, which will be described later. In the panels 32, 34, 36, 38, the projections 32P, 34P, 36P, 38P are connected integrally with the panel grooves 32G, 34G, 36G, 38G, respectively. The panel groove 32G of the front panel 32, the panel groove 36G of the left-hand side panel 36, and the panel groove 38G of the right-hand side panel 38 are provided at portions of the lower end portions of the panels 32, 36, 38 respectively, while the panel groove 34G of the rear panel 34 is provided to extend substantially over a whole area of the lower end portion of the rear panel 34. Next, referring to FIGS. 3 and 8, the lower case 24 will be described. The lower case 24 has substantially a plate shape, and the internal part IP of the projector 10 is mounted on an upper surface side thereof. Plural screw holes, bosses, and the like are provided in and on the lower case 24 so as to fixedly mount the internal part IP. A lower lens barrel supporter 24*d* for supporting a lower side portion of the lens barrel 42 is provided in a position which is superposed on the lens barrel 42 in the up-down direction on the upper surface side of the lower case 24. The lower lens barrel supporter 24*d* projects substantially into an arc shape along the outer circumferential surface of the lens barrel 42. Additionally, a case side hinge attachment portion 24H is provided on both left- and right-hand sides of a front portion of the lower case 24 for attachment of the tilt hinge mechanism of the projector 10.

First abutment portions 24*b*1 are provided in positions which are superposed on the first bosses B1 in the up-down direction on the upper surface side of the lower case 24, so that the first abutment portions 24*b*1 are brought into abutment with the distal portions Bib of the corresponding first bosses B1 via the respective projections 32P, 34P, 36P, 38P of the panels 32, 34, 36, 38. That is, five first abutment portions 24*b*1 are provided on the upper surface side of the lower case 24. A threaded hole is provided in each first abutment portion 24*b*1 so that the first screw S1 is screwed thereinto. Additionally, second abutment portions 24*b*2 are provided in positions which are superposed on the second bosses B2 in the up-down direction on the upper surface side of the lower case 24, so that the second abutment portions 24*b*2 are brought into abutment with the distal portions B2*b* of the corresponding second bosses B2. That is, seven second abutment portions 24*b*2 are provided on the upper surface side of the lower case 24. A threaded hole is provided in each second abutment portion 24*b*2 so that the second screw S2 is screwed thereinto. The first abutment portions 24*b*1 and the second abutment portions 24*b*2, which are provided on the upper surface side of the lower case 24, each have substantially a circular disk shape.

The lower case rib (a first engagement portion) 24*r* is provided on an outer edge portion of the upper surface side of the lower case 24 in such a manner as to extend along the outer edge portion. The lower case rib 24*r* is provided in such a manner as to rise perpendicularly from the outer edge portion. The lower case rib 24*r* is provided to extend substantially along a full circumference of an internal surface side of the lower case 24 excluding four corners of the lower case 24, portions on the outer edge portion which correspond to the portions where the first abutment portions 24*b*1 and the second abutment portions 24*b*2 are provided, and the portions where the lower lens barrel supporter 24*d* and the case side hinge attachment portions 24H are provided. In other words, the first abutment portions 24*b*1 and the second abutment portions 24*b*2 on the outer edge portion are connected integrally with the lower case rib 24*r*. In the present embodiment, the substantially full circumference is exemplified by the configuration in which the lower case rib 24*r* is provided along the full circumferential area of the internal surface side of the lower case 24 excluding the four corners, and the portions where the first and second abutment portions, the lower lens barrel supporter, and the case side hinge attachment portions are disposed as described above; however, the substantially full circumference also includes a configuration in which the lower case rib 24*r* is provided over a whole area along the full circumference of the internal surface side of the lower case 24.

Figure 3:
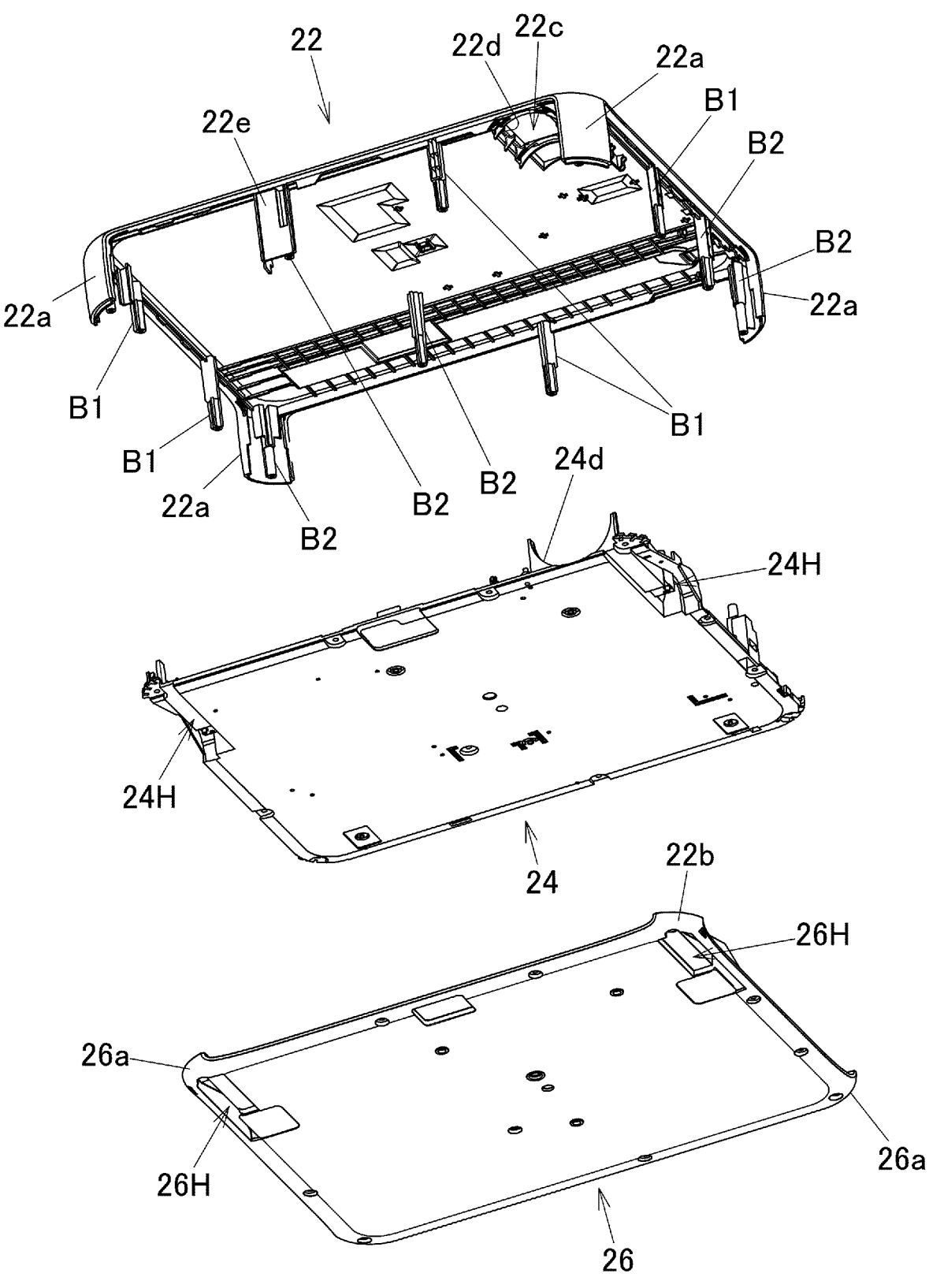
FIG. 3 is an exploded perspective view of an upper case, a lower case, and a bottom cover which make up the projector according to the embodiment.
Figure 9:
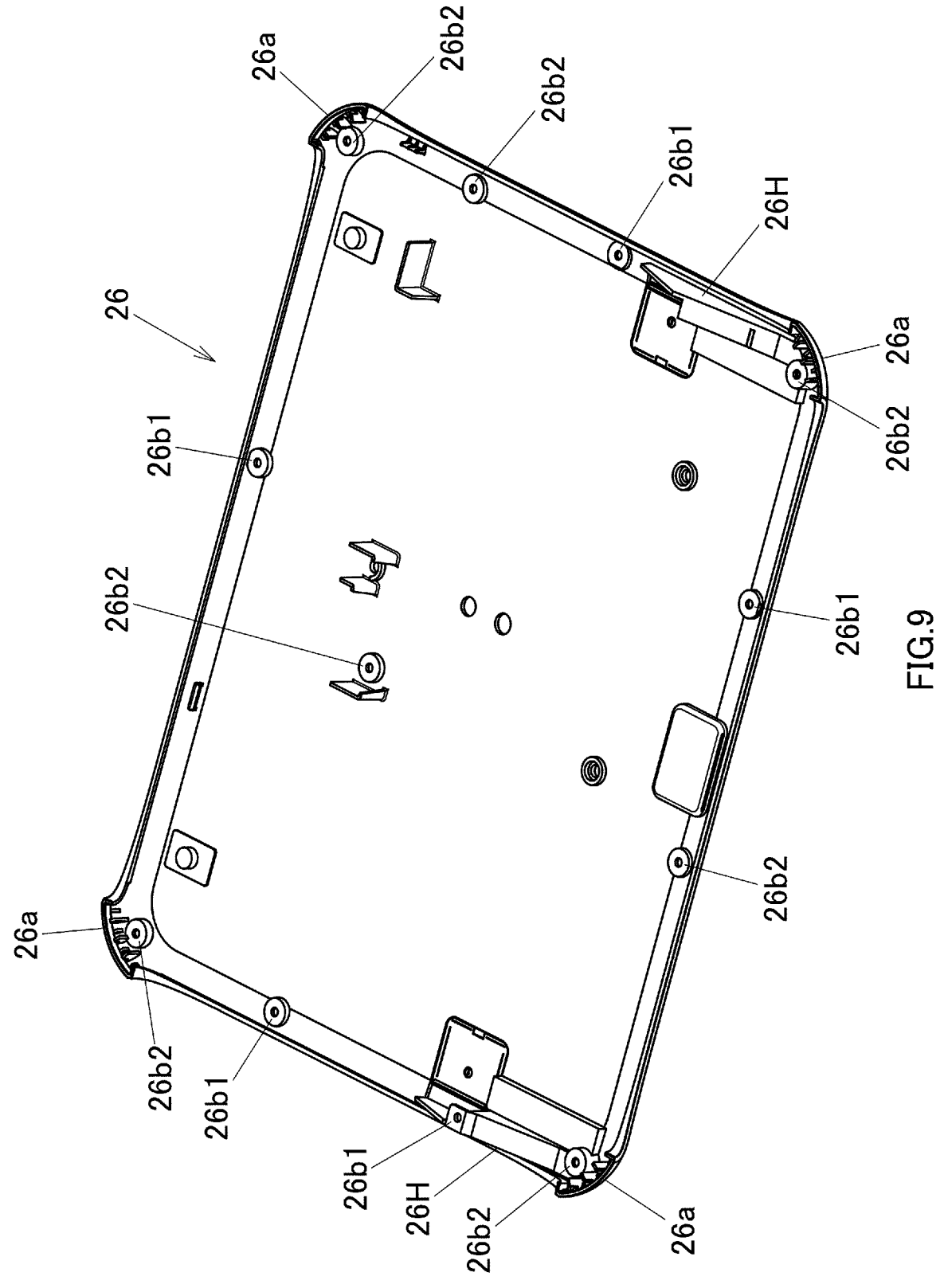
FIG. 9 is a perspective view of the bottom cover of the projector according to the embodiment as viewed from the front upper side.

Next, referring to FIGS. 2, 3 and 9, the bottom cover 26 will be described. The bottom cover 26 has substantially a plate shape which is one size larger than the lower case 24. Corner receiving portions 26*a* are provided at four corners of an upper surface side of the bottom cover 26, and the corner receiving portions 26*a* are brought into abutment with the corresponding case corners 22*a* of the upper case 22. The corner receiving portions 26*a* project slightly upwards from the four corners of the upper surface side of the bottom cover 26. An external surface of each corner receiving portion 26*a* is formed into a rounded corner which follows the external surface of the corresponding case corner 22*a*. Each corner receiving portion 26*a* is brought into abutment with the corner stopper 22*al* of the corresponding case corner 22*a* on an internal surface of a distal end side thereof. As a result, the case corners 22*a* of the upper case 22 are configured to be brought into engagement with the corresponding corner receiving portions 26*a* of the bottom cover 26.

First holders 26*b*1 are provided in positions which are superposed on the first bosses B1 in the up-down direction on the upper surface side of the bottom cover 26 so as to hold the first abutment portions 24*b*1 of the lower case 24 between the first bosses B1 and the first holders 26*b*1. That is, five first holders 26*b*1 are provided on the upper surface side of the bottom cover 26. A threaded hole is provided in each first holder 26*b*1 so that the first screw S1 is screwed thereinto. Additionally, second holders 26*b*2 are provided in positions which are superposed on the second bosses B2 in the up-down direction on the upper surface side of the bottom cover 26 so as to hold the second abutment portions 24*b*2 of the lower case 24 between the second bosses B2 and the second holders 26*b*2. That is, seven second holders 26*b*2 are provided on the upper surface side of the bottom cover 26. A threaded hole is provided in each second holder 26*b*2 so that the second screw S2 is screwed thereinto. The first holders 26*b*1 and the second holders 26*b*2, which are provided on the upper surface side of the bottom cover 26, each have substantially a circular disk shape.

On the other hand, as shown in FIG. 2, first screw screwing portions 26*s*1 are provided in positions corresponding to the first holders 26*b*1 on a lower surface side of the bottom cover 26, so that the first screws S1 are screwed inwards therefrom for fastening. That is, five first screw screwing portions 26*s*1 are provided on the lower surface side of the bottom cover 26. Additionally, second screw screwing portions 26*s*2 are provided in positions corresponding to the second holders 26*b*2, so that the second screws S2 are screwed inwards therefrom for fastening. That is, seven second screw screwing portions 26*s*2 are provided on the lower surface side of the bottom cover 26. The first screw screwing portions 26*s*1 and the second screw screwing portions 26*s*2 are both formed substantially into circular recesses enabling the entrance of heads of the first screws S1 and the second screws S2 (excluding the first screw screwing portion 26s1 provided inside the cover side hinge attachment portion 26H).

Figure 10:
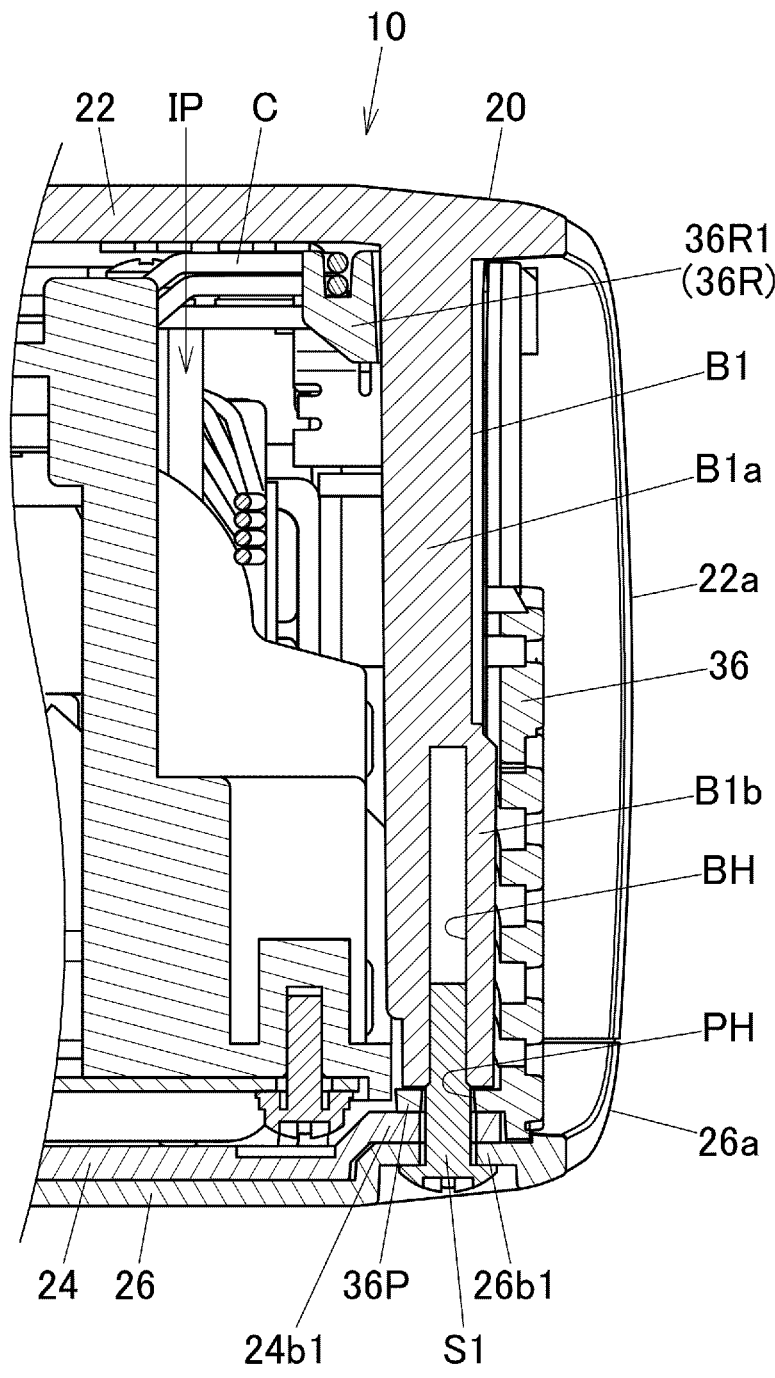
FIG. 10 is a vertical sectional view of a vicinity of the left panel of the projector according to the embodiment, which is a sectional view taken along a line X-X in FIG. 6.

Next, a mode will be described in which the case 20 making up the projector 10 is assembled up. As shown in FIGS. 2 and 10, in the case 20, with the first bosses B1 passed through the annular portions 32R, 34R, 36R, 38R, the first bosses B1, the panels 32, 34, 36, 38, the lower case 24, and the bottom cover 26 are fastened all together. In other words, the panels 32, 34, 36, 38, the lower case 24, and the bottom cover 26 are fastened together to the first bosses B1. Specifically speaking, the projections 32P, 34P, 36P, 38P, the first abutment portions 24b1, and the first holders 26b1 are sequentially superposed one on another in that order onto the distal portions Bib of the first bosses B1 from an upper side in such a state that the projections 32P, 34P, 36P, 38P, the first abutment portions 24b1, and the first holders 26bi are brought into abutment with or stay close to one another, and the first screws S1 are screwed into the threaded holes BH in the first bosses B1 from a lower surface side of the case 20 to thereby fasten together the first bosses B1, the panels 32, 34, 36, 38, the lower case 24, and the bottom cover 26.

Further, the second abutment portions 24b2 and the second holders 26b2 are sequentially superposed one on the other in that order onto the distal portions B2b of the second bosses B2 from the upper side, and the second screws S2 are screwed into the threaded holes BH in the second bosses B2 from the lower surface side of the case 20 to thereby fasten the second bosses B2, the lower case 24, and the bottom cover 26 together.

Figure 11:
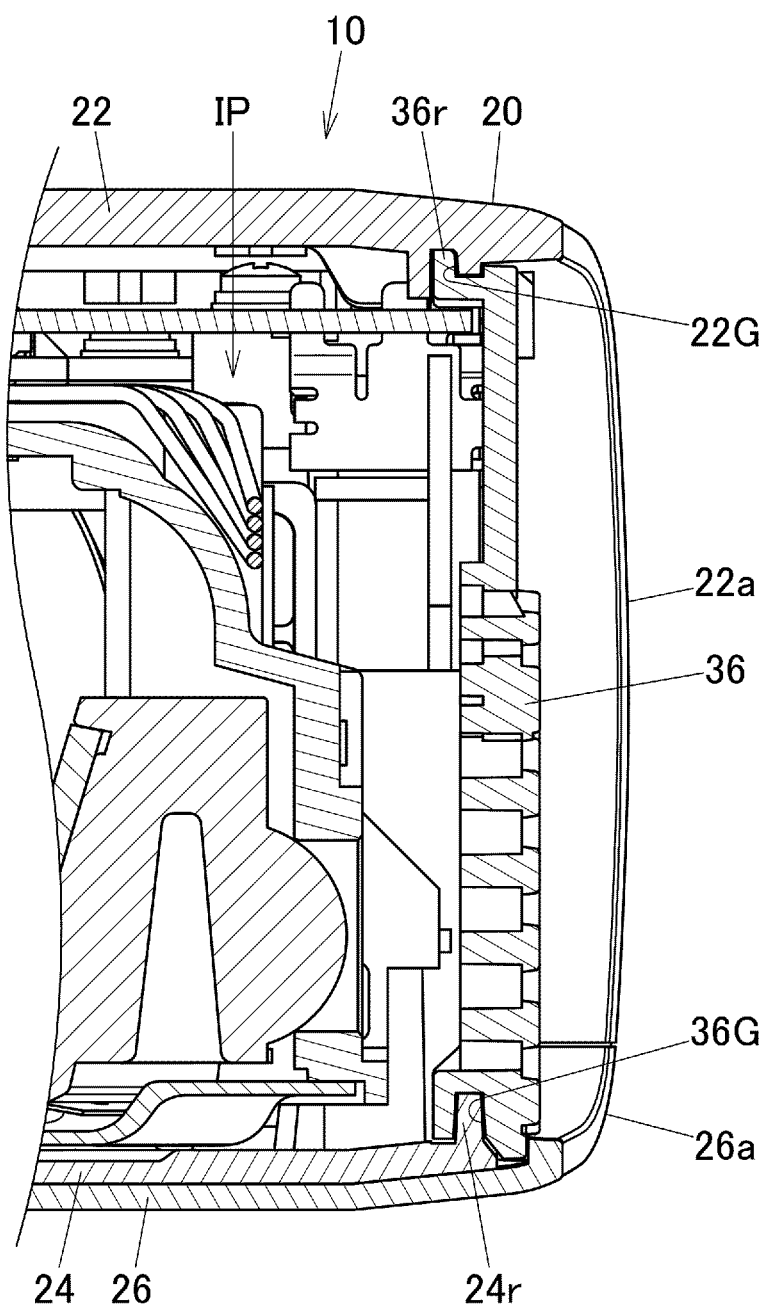
FIG. 11 is a vertical sectional view of the vicinity of the left panel of the projector according to the embodiment, which is a sectional view taken along a line XI-XI in FIG. 6.

Additionally, as shown in FIG. 11, in the case 20, the fastening operations are executed as described above in such a state that the panel grooves 32G, 34G, 36G, 38G of the panels 32, 34, 36, 38 are brought into engagement with the lower case rib 24r, and that the panel ribs 32r, 34r, 36r, 38r of the panels 32, 34, 36, 38 are brought into engagement with the upper case groove 22G of the upper case 22. The panel ribs 32r, 34r, 36r, 38r and the upper case groove 22G are brought into engagement with each other in such a state that the upper case projections 22G1 are fitted in the panel recessed portions 32U, 34U, 36U, 38U. In addition, the case corners 22a of the upper case 22 are locked on the corner receiving portions 26a of the bottom cover 26.

Figure 12:
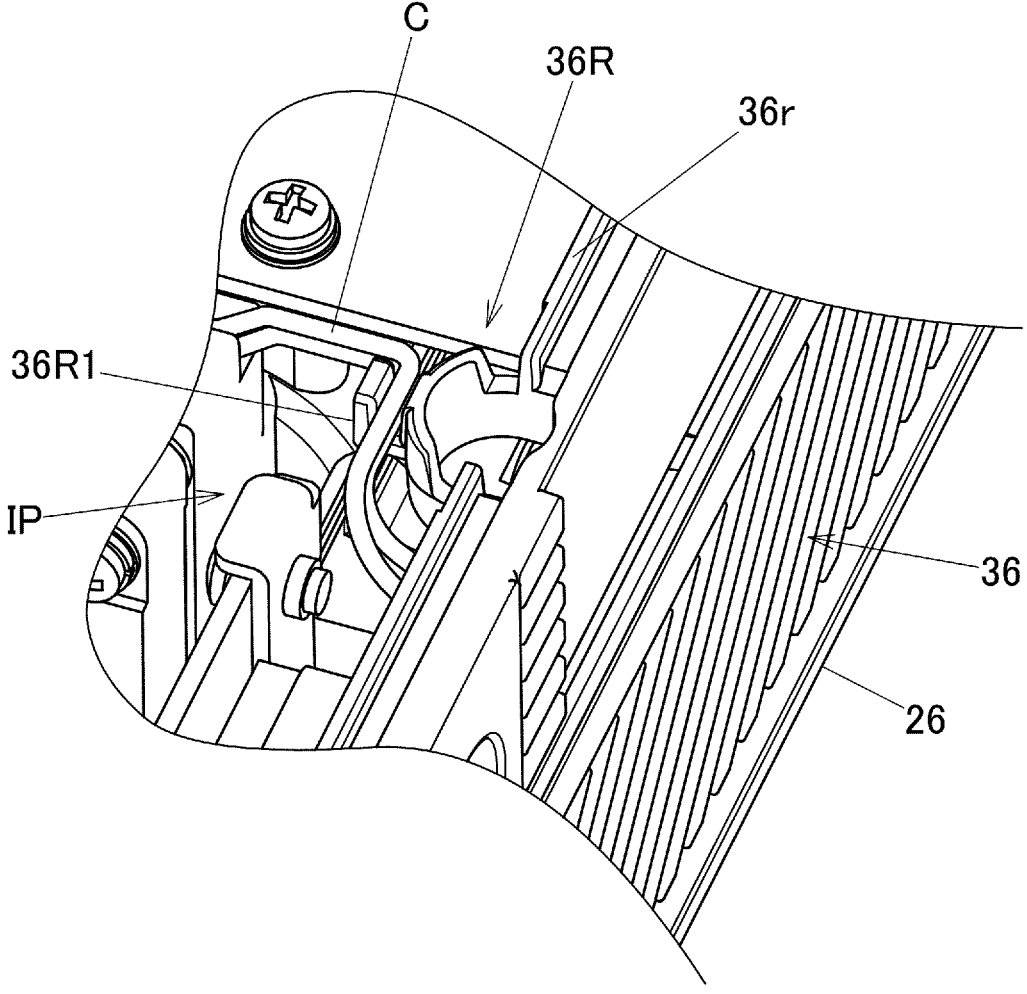
FIG. 12 is a perspective view of a vicinity of an annular portion of the left panel of the projector according to the embodiment as viewed from above with the upper case disassembled from the projector.

Here, as shown in FIG. 6, the annular portions 32R, 34R, 36R, 38R which are provided on the panels 32, 34, 36, 38, respectively, are disposed in such a manner as not to interfere with the internal part IP inside the case 20. In addition, as shown in FIGS. 10 and 12, a hook portion 36R1 having a hook shape is provided on an external surface of the distal end portion of the annular portion 36R of the left-hand side panel 36. Wiring C of the internal part IP is laid out while being bundled up to be locked in the hook portion 36R1. Similarly, a hook portion into which nearby wiring is bundled up to be locked may also be provided on the other annular portions 32R, 34R, 38R.

Figure 13:
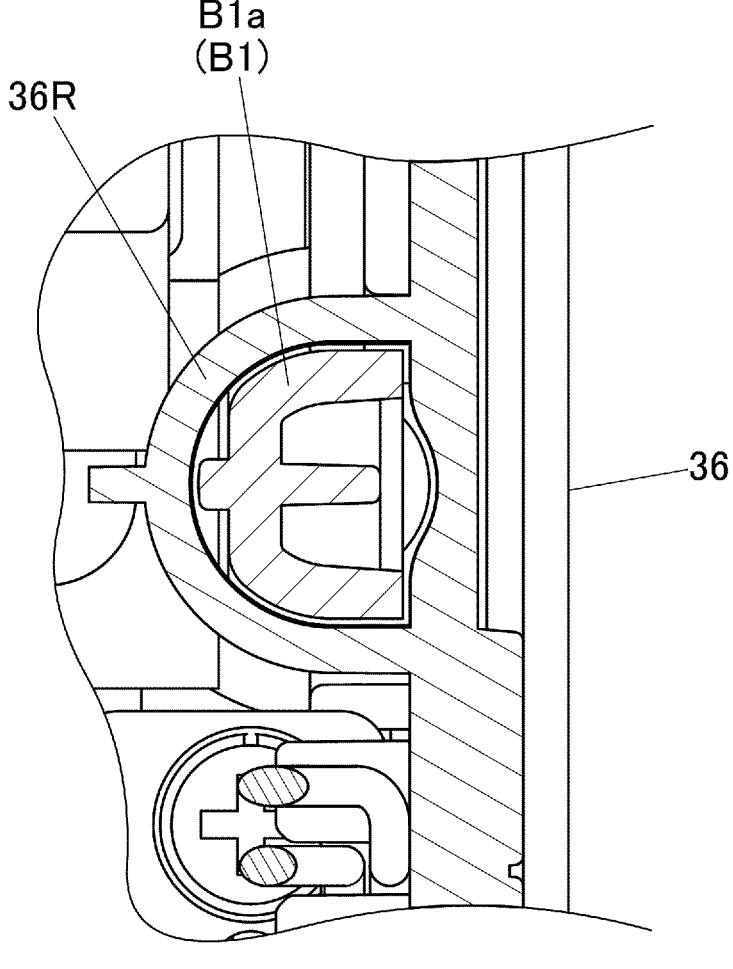
FIG. 13 is a horizontal sectional view of a first boss which is passed through the annular portion in the vicinity of the annular portion of the left panel of the projector according to the embodiment.

As shown in FIG. 13, the first boss B1 (the proximal portion B1a) is passed through the annular portion 36R with a slight gap defined relative to the annular portion 36R having substantially a ring shape (specifically, a semi-ring shape) in a radial direction (a direction perpendicular to the up-down direction) thereof. In other words, an outside diametrical dimension of the proximal portion B1a of the first boss B1 and opening diameters of the annular portions 32R, 34R, 36R, 38R are sized so that a slight gap is generated therebetween. Although the annular portion 36R of the left-hand side panel 36 is shown in FIG. 13, this configuration is also similarly applied to the other annular portions 32R, 34R, 38R. A vertical dimension of the portion of the annular portions 32R, 34R, 36R, 38R through which the first boss B1 is passed is made to be such a dimension as to secure enough strength to regulate the position of the panels 32, 34, 36, 38 in a direction perpendicular to the up-down direction thereof relative to the first boss B1 and to avoid an interference with the internal part IP of the projector 10. In one example, the vertical dimension of the portion of the annular portions 32R, 34R, 36R, 38R through which the first boss B1 is passed is a dimension which is one eights of a vertical dimension of the first boss B1. In this way, it is preferable that the vertical dimension of the afore-described portion of the annular portions 32R, 34R, 36R, 38R is made as large as possible.

Next, a method for assembling up the case 20 making up the projector 10 (a fabrication method of the projector 10) will be described. In an assembling process of the case 20, firstly, the internal part IP of the projector 10 configured to be accommodated in the case 20 is mounted on the lower case 24 for assembling (a mounting step). Subsequently, the panel grooves 32G, 34G, 36G, 38G of the panels 32, 34, 36, 38 are brought into engagement with the lower case rib 24r provided on the outer edge portion on the upper surface side of the lower case 24 with the panel 32, 34, 36, 38 erected individually (as shown in FIG. 4). That is, as shown in FIG. 6, the panels 32, 34, 36, 38 are brought into engagement with the outer edge portion of the lower case 24 with the panels 32, 34, 36, 38 erected so as to surround the internal part IP (an engagement step). At this time, the panels 32, 34, 36, 38 are brought into engagement with the lower case 24 in such a manner that the projections 32P, 34P, 36P, 38P of the panels 32, 34, 36, 38 are superposed on the corresponding first abutment portions 24b1 of the lower case 24.

Subsequently, the upper case 22 is positioned so that the first bosses B1 on the upper case 22 are passed through the corresponding annular portions 32R, 34R, 36R, 38R which are provided on the upper end sides of the panels 32, 34, 36, 38. Then, the upper case 22 is placed over the panels 32, 34, 36, 38 while the first bosses B1 on the upper case 22 are being passed through the corresponding annular portions 32R, 34R, 36R, 38R (refer to broken lines shown in FIG. 6), and the upper case 22 is superposed on the panels 32, 34, 36, 38 in the up-down direction (a superposition step). In other words, the upper case 22 is disposed above the internal part IP mounted on the lower case 24. At this time, the upper case 22 is disposed so as to cover the internal part IP from the upper side and is then placed thereover while the upper case groove 22G provided in the outer edge portion on the lower surface side of the upper case 22 is being brought into engagement with the panel ribs 32r, 34r, 36r, 38r of the panels 32, 34, 36, 38. Additionally, at this time, the upper case 22 is placed over the panels 32, 34, 36, 38 while the upper case projections 22G1 on the upper case 22 are being brought into engagement with the panel recessed portions 32U, 34U, 36U, 38U of the panels 32, 34, 36, 38.

As a result, the projections 32P, 34P, 36P, 38P of the panels 32, 34, 36, 38 are superposed on the first bosses B1 in the up-down direction, whereby the panels 32, 34, 36, 38 are held between the upper case 22 and the lower case 24 with the panels 32, 34, 36, 38 kept in strong and rigid engagement with the upper case 22 and the lower case 24. In this step, the upper case 22 may be pushed in until the distal portions Bib of the first bosses B1 are brought into abutment with the projections 32P, 34P, 36P, 38P of the panels 32, 34, 36, 38 and the distal portions B2b of the second bosses B2 are brought into abutment with the second abutment portions 24b2 of the lower case 24.

Subsequently, the whole of the assembled structure is turned over so that the lower case 24 is oriented upwards, and in this state, the bottom cover 26 is placed over the lower case 24 with the first screw screwing portions 26s1 and the second screw screwing portions 26s2 oriented upwards (with the lower surface side oriented upwards). At this time, the bottom cover 26 is placed over the lower case 24 so that the first screw screwing portions 26s1 are superposed on the first abutment portions 24b1 and the second screw screwing portions 26s2 are superposed on the second abutment portions 24b2 of the lower case 24 in the up-down direction. As a result, the screw holes of the first screw screwing portions 26s1 (the first holders 26b1), the screw holes of the first abutment portions 24b1, and the projection screw holes PH of the projections 32P, 34P, 36P, 38P communicate with the threaded holes BH of the first bosses B1, and the screw holes of the second screw screwing portions 26s2 (the second holders 26b2) and the screw holes of the second abutment portions 24b2 communicate with the threaded holes BH of the second bosses B2. Additionally, the corner receiving portions 26a of the bottom cover 26 are brought into abutment with the corresponding case corners 22a of the upper case 22, and the corner stoppers 22al are locked on the corresponding corner receiving portions 26a.

Subsequently, the first screws S1 are passed through the screw holes of the first screw screwing portions 26s1 so as to be screwed into the threaded holes BH of the first bosses B1, whereby the first holders 26b1 of the bottom cover 26, the first abutment portions 24b1 of the lower case 24, and the projections 32P, 34P, 36P, 38P are fastened all together to the first bosses B1. Further, the second screws S2 are passed through the screw holes of the second screw screwing portions 26s2 so as to be screwed into the threaded holes BH of the second bosses B2, whereby the second holders 26b2 of the bottom cover 26, and the second abutment portions 24b2 of the lower case 24 are fastened all together to the second bosses B2 (an integrating fastening step). By executing the series of steps described above, the component parts making up the case 20 are assembled together strongly and rigidly, whereby the projector 10 can be fabricated.

MODIFIED EXAMPLE

Figure 14:
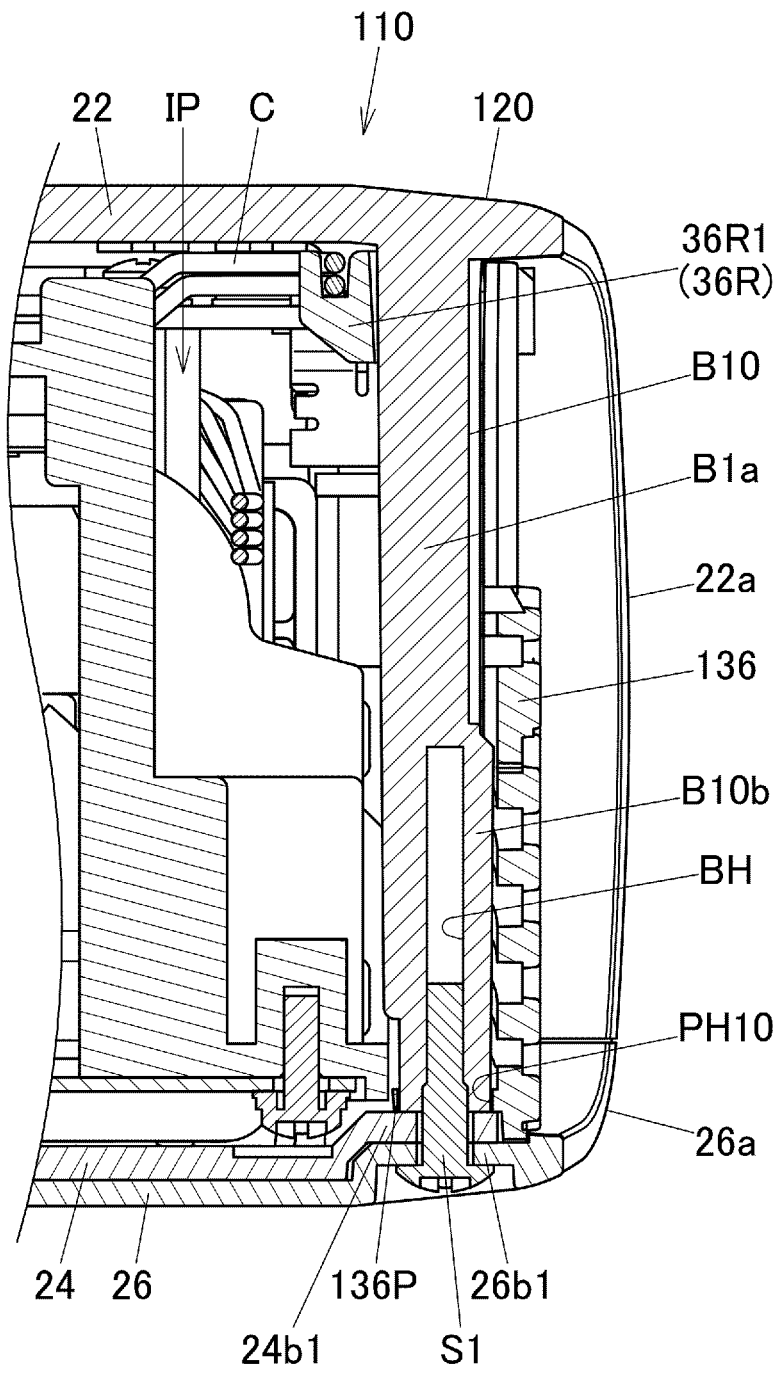
FIG. 14 is a vertical sectional view of the vicinity of a left panel of a projector according to a modified example of the embodiment, which is a sectional view of a section corresponding to the section taken along the line X-X in FIG. 6.

Next, referring to FIG. 14, a modified example according to the embodiment of the present disclosure will be described. A projector 110 according to the modified example differs from the projector 10 in the configuration of panel projections provided on individual panels (only a left-hand side panel 136 and a panel projection 136P thereof are shown in FIG. 14) and the configuration of distal portions B10b of first bosses B10 extending from a case 120. The other configurations remain the same as those described in the embodiment, and hence, the description thereof will be omitted here. The panel projection 136P according to the modified example is formed into a thin substantially annular shape. A projection screw hole PH10 is provided in the panel projection 136P so as to allow a passage of the distal portion B10b of the first boss B10.

As shown in FIG. 14, in the modified example, the distal portion B10b of the first boss B10 is passed through the projection screw hole PH10 of the panel projection 136P. The distal portion B10b of the first boss B10 extends longer than in the embodiment and is brought into abutment with or lies close to a first abutment portion 24b1 of a lower case 24 without involving the panel projection 136P. To describe this in detail, the first abutment portion 24b1 and a first stopper 26b1 are superposed sequentially on the distal portion B10b of the first boss B10 in that order from an upper side with the first abutment portion 24b1 and the first stopper 26b1 kept in abutment with or lying close to each other, and a first screw S1 is screwed into a threaded hole BH in the first boss B10 from a lower side of a case 20, whereby the first abutment portion 24b1 and the first stopper 26b1 are fastened together to the first boss B10. Here, distal portions Bib of the remaining first bosses B1 are also brought into engagement with panel projections provided on the other panels 32, 34, 38 than the left-hand side panel 136 in a similar manner for assemblage.

With the electronic equipment according to JP-A-2018-17964, the front, rear, left, and right side surfaces are made up of the lower case. On the other hand, with the electronic equipment configured so that the internal part is held between the upper case and the lower case as described therein, in order to improve the design property and functionality, the front, rear, left, and right side surfaces are desired from time to time to be provided as separate panel-shaped component parts. However, in the case that the individual side surfaces are provided as separate component parts in the electronic equipment of the JP-A-2018-17964, there is a risk of the side surface parts being disassembled from the upper and lower cases as a result of the fall of the case, whereby the robustness has been unable to be secured. Additionally, the assembling work of assembling the component parts making up the side surfaces is necessary separately in the fabrication process.

In contrast with this, as has been described heretofore, the projector 10 according to the embodiment includes the upper case 22, the lower case 24 provided with the internal part IP disposed between the upper case 22 and the lower case 24, and the panels 32, 34, 36, 38 which are configured to be provided in the side spaces defined between the upper case 22 and the lower case 24. Then, the panels 32, 34, 36, 38 have the annular portions 32R, 34R, 36R, 38R, respectively, which are provided to be oriented towards the internal part IP and opened to penetrate in the up-down direction, the upper case 22 has the first bosses B1 extending in the up-down direction and configured to be inserted to pass through the annular portions 32R, 34R, 36R, 38R, and the lower case 24 is fixed to the first bosses B1.

With this configuration, the electronic equipment which can secure the robustness and facilitate the assemblage of the component parts and the fabrication method of the electronic component so configured can be provided.

That is, with the projector 10 according to the embodiment, the first bosses B1 of the upper case 22 extending in the up-down direction are passed through the annular portions 32R, 34R, 36R, 38R of the panels 32, 34, 36, 38, whereby the positions of the panels 32, 34, 36, 38 relative to the first bosses B1 (the positions in the direction perpendicular to the up-down direction) are regulated, and the panels 32, 34, 36, 38 are fixed to the upper case 22. Then, the panels 32, 34, 36, 38 are provided between the upper case 22 and the lower case 22 with the panels 32, 34, 36, 38 fixed to the upper case 22 and the lower case 24 in the way described above, and the lower case 24 is fixed to the first bosses B1 of the upper case 22, whereby even in the event that an impact is exerted on the projector 10 as a result of the fall thereof or the like, the panels 32, 34, 36, 38 are prevented or restrained from being disassembled from between the upper case 22 and the lower case 24 (from being caused to open outwards). As a result, the robustness of the upper case 22, the lower case 24, and the panels 32, 34, 36, 38 which make up the case 20 is secured sufficiently with the simple configuration.

Further, in the assembling process of the projector 10, the first bosses B1 extending from the upper case 22 are passed through the annular portions 32R, 34R, 36R, 38R of the panels 32, 34, 36, 38 which are fixed to the lower case 24 (in other words, by introducing the first bosses B1 into the annular portions 32R, 34R, 36R, 38R), whereby the upper case 22 can be superposed on the right positions, so that the upper case 22 can be assembled easily while the upper case 22 is being fixed to the panels 32, 34, 36, 38 without being fastened with screws. Thus, as has been described heretofore, with the present embodiment, the projector 10 can be realized which can secure the robustness and facilitate the assemblage of the component parts.

With the projector 10, the panels 32, 34, 36, 38 have the projections 32P, 34P, 36P, 38P, respectively, which project towards the internal part IP, and the first bosses B1, the projections 32P, 34P, 36P, 38P, and the lower case 24 are fastened all together. As a result, the upper case 22, the lower case 24, and the panels 32, 34, 36, 38 (the projections 32P, 34P, 36P, 38) are fixed to one another strongly and rigidly, thereby making it possible to increase the robustness of the projector 10 further. Further, in the assembling process of the projector 10, the upper case 22, the lower case 24, and the panels 32, 34, 36, 38 can be fastened all together at one time through the integrating fastening, whereby the assemblage of the upper case 22, the lower case 24, and the panels 32, 34, 36, 38, which make up the case 20 of the projector 10, can be facilitated further.

With the projector 10, the annular portions 32R, 34R, 36R, 38R have substantially the ring shape. As a result, compared with, for example, a case in which the annular portions 32R, 34R, 36R, 38R have an angular ring shape, stress is hardly concentrated to a part of the annular portions 32R, 34R, 36R, 38R, whereby the strength of the annular portions 32R, 34R, 36R, 38R can be enhanced.

With the projector 10, the lower case 24 has the lower case rib 24r, and the panels 32, 34, 36, 38 have the panel grooves 32G, 34G, 36G, 38G which are configured to be brought into engagement with the lower case rib 24r. As a result, in the assembling process of the projector 10, the panels 32, 34, 36, 38 can be fixed to the lower case 24 without being fastened thereto with screws by bringing the panel grooves 32G, 34G, 36G, 38B into engagement with the lower case rib 24r. This can facilitate the assemblage of the component parts further in the assembling process of the projector 10.

With the projector 10, the annular portions 32R, 34R, 36R,38R are provided at the end portions of the panels 32, 34, 36, 38 which face the upper case 22 in the up-down direction. As a result, compared with a case in which the annular portions 32R, 34R, 36R,38R are provided at the end portions which face the lower case 24, a smaller distance is defined between the annular portions 32R, 34R, 36R, 38R and the upper case 22, whereby the panels 32, 34, 36, 38 can be fixed to the upper case more strongly and rigidly.

With the projector 10, the panels 32, 34, 36, 38 have panel ribs 32r, 34r, 36r, 38r, respectively, and the upper case 22 has the upper case groove 22G which is brought into engagement with the panel ribs 32r, 34r, 36r, 38r. As a result, the panels 32, 34, 36, 38 can be fixed to the upper case 22 by the panel ribs 32r, 34r, 36r, 38r in addition to the annular portions 32R, 34R, 36R, 38R by bringing the panel ribs 32r, 34r, 36r, 38r into engagement with the upper case groove 22G. This enables the panels 32, 34, 36, 38 to be fixed to the upper case 22 more strongly and rigidly.

With the projector 10, the annular portions 32R, 34R, 36R, 38R are provided in such a manner as to be connected integrally with the panel ribs 32r, 34r, 36r, 38r, respectively, and the first bosses B1 are provided in such a manner as to be connected integrally with the upper case groove 22G. As a result, not only the strength of the annular portions 32R, 34R, 36R, 38R and the strength of the panel ribs 32r, 34r, 36r, 38r can both be enhanced, but also the strength of the first bosses B1 and the strength of the upper case groove 22G can both be enhanced. This enables the robustness of the projector 10 to be enhanced further.

With the projector 10, the panel ribs 32r, 34r, 36r, 38r include partially the panel recessed portions 36U which are formed into the recess, and the upper case groove 22G includes partially the upper case projections 22G1 which are formed into the projection and are configured to be fitted in the panel recessed portions 36U. As a result, the panels 32, 34, 36, 38 can be prevented from deviating in position along the extending direction of the panel ribs 32r, 34r, 36r, 38r. This can not only facilitate the assemblage of the panels 32, 34, 36, 38 and the upper case 22 further but also enhance the robustness of the projector 10 further.

With the projector 10, the upper case groove 22G is provided along substantially the full circumference of the outer edge portion of the upper case 22. As a result, the panels 32, 34, 36, 38 can be fixed to the upper case 22 along substantially the full circumference of the outer edge portion thereof, whereby the robustness of the projector 10 can be enhanced further.

With the projector 10, the lower case rib 24r is provided to extend along substantially the full circumference of the outer edge portion of the lower case 24. As a result, the panels 32, 34, 36, 38 can be fixed to the lower case 24 along substantially the full circumference of the outer edge portion thereof, whereby the robustness of the projector 10 can be enhanced further.

In addition, the projector 10 includes the bottom cover 26 which covers the side of the lower case 24 which is opposite to the side on which the internal part IP is provided, and the bottom cover 26 is fastened together with the lower case 24 and the projections 32P, 34P, 36P, 38P to the first bosses B1. As a result, in the case that the lower case 24 is made of metal which is difficult to be painted, the design property of the lower surface side of the projector 10 can be enhanced by covering the lower case 24 with the bottom cover 26. Further, the upper case 22, the lower case 24, and the panels 32, 34, 36, 38 can be fastened all together with the bottom cover 26 at one time through the integrating fastening, whereby the robustness and the easiness of assemblage of the component parts of the projector 10 can be enhanced further. Here, in the modified example of the present embodiment described above, too, the bottom cover 26, the lower case 24, and the first bosses B10 (B1) are fastened all together, and the projections 136P (32P, 34P, 38P) are brought into engagement with the first bosses B10 (B1). As a result, in the modified example, too, the robustness and the easiness of assemblage of the component parts of the projector 10 can be enhanced further.

With the projector 10, the upper case 22 has the second bosses B2 which extend in the up-down direction and are not configured to be passed through the annular portions 32R, 34R, 36R, 3R, and the bottom cover 26 is fastened together with the lower case 24 to the second bosses B2. As a result, the bottom cover 26 and the lower case 24 are fixed to the upper case 22 via the second bosses B2 in addition to the first bosses B1, whereby the robustness of the projector 10 including the bottom cover 26 can be enhanced further. Additionally, the bottom cover 26 and the lower case 24 can be fastened together fixedly to the upper case 22 via the second bosses B2 even in the positions in the internal space of the projector 10 where the annular portions 32R, 34R, 36R, 38R cannot be provided.

With the projector 10, the annular portions 32R, 34R, 36R, 38R are provided at least one on each of the panels 32, 34, 36, 38. As a result, the panels 32, 34, 36, 38 can be fixed to the upper case 22 via the annular portions 32R, 34R, 36R, 38R in an ensured fashion, whereby the robustness of the projector 10 can be enhanced further.

With the projector 10, the portion of the outer circumferential surface of the proximal portion B1a of the first boss B1 which is configured to be passed through the annular portions 32R, 34R, 36R, 38R is formed into the arc shape, and the proximal portion B1a of the first boss B1 is passed through the annular portions 32R, 34R, 36R, 38R with the slight gap defined relative to the annular portions 32R, 34R, 36R, 38R in the radial direction (the direction perpendicular to the up-down direction (the pass-through direction of the first boss B1)) thereof. As a result, even in the event that the upper case deviates in position in the horizontal direction (the radial direction of the annular portions 32R, 34R, 36R, 38R) relative to the panels 32, 34, 36, 38, a risk can be prevented or suppressed of stress concentrating to the annular portions 32R, 34R, 36R, 38R as a result of the first bosses B1 coming to interfere strongly with the corresponding annular portions 32R, 34R, 36R, 38R.

With the projector 10, the annular portion 36R provided on the left-hand side panel 36 has the hook portion 36R1 having the hook shape which is configured to hold the wiring C of the internal part IP. As a result, the wiring C of the internal part IP can be laid out efficiently by the hook portion 36R1, whereby a sufficient space where to provide the annular portions 32R, 34R, 36R, 38R can be secured around the internal part IP.

With the projector 10 as the electronic equipment, the projection port opening 32a is provided in the front panel 32, and the annular portions 32R, 34R, 36R, 38R are provided so as not to interfere with the internal part IP. As a result, the upper case 22 and the panels 32, 34, 36, 38 can be fixed to each other via the annular portions 32R, 34R, 36R, 38R within the limited space inside the projector 10, whereby the projector 10 can be realized in which not only the robustness but also the internal space utilization efficiency is enhanced.

The projector fabrication method according to the present embodiment includes the mounting step of mounting the internal part IP of the projector 10 which is configured to be disposed between the upper case 22 and the lower case 22 on the lower case 24, the engagement step of bringing the panels 32, 34, 36, 38 into engagement with the lower case 24 with the panels 32, 34, 36, 38 erected around the internal panel IP, the superposition step of superposing the upper case 22 on the panels 32, 34, 36, 38 while causing the first bosses B1 on the upper case 22 to pass through the annular portions 32R, 34R, 36R, 38R of the panels 32, 34, 36, 38 which are in engagement with the lower case 24, and the integrating fastening step of fastening together the first bosses B1, the lower case 24, and the panels 32, 34, 36, 38 with the first screws S1.

With the fabrication method described above, the panels 32, 34, 36, 38 can be fixed temporarily to the lower case 24 without being fastened with the screws with the panels 32, 34, 36, 38 erected around the internal part IP in the engagement step, whereby a step can be omitted of fastening the panels 32, 34, 36 38 with the screws for temporary fixing. Additionally, the upper case 22 can be positioned easily with respect to the lower case 24 and the panels 32, 34, 36 38 by causing the first bosses B1 to pass through the corresponding annular portions 32R, 34R, 36R, 38R in the superposition step. Further, the upper case 22, the lower case 24, and the panels 32, 34, 36, 38 can be fastened all together at one time with the first screws S1 in the integrating fastening step, whereby the component parts can be assembled together strongly and rigidly. In this way, in the fabrication method, the projector 10 having the high robustness can be fabricated through the easy assembling steps.

With the projector 10 according to the present embodiment, the improvement in design property and functionality and the securement of robustness are made compatible with each other by providing the panels 32, 34, 36, 38 as the separate component parts from the upper case 22 and the lower case 24, whereby the additional value to the projector 10 as a product can be improved.

The embodiment that has been described heretofore is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

For example, while the configuration is exemplified in the embodiment described above in which at least one annular portion is provided on each panel, a configuration may also be adopted in which at least two annular portions are provided on each panel. In this case, each panel can be fixed to the upper case more strongly and rigidly via the annular portions so provided, whereby the robustness of the projector can be enhanced further. Additionally, while the configuration is exemplified in the embodiment described above in which the second bosses which are not passed through the annular portions are provided on the upper case, a configuration may also be adopted in which the second bosses are not provided on the upper case. Even in the case that this configuration is adopted, the projector can be realized which can not only secure the robustness but also facilitate the assemblage of the component parts. Further, while the configuration is exemplified in the embodiment described above in which the annular portions constituting the guides have the annular shape, the guides are not limited to those having the annular shape, and hence, the guides need only have any shape including, for example, a C-shape or the like which enables the passage of the first boss for engagement. In the embodiment described above, while the projector is exemplified as the electronic equipment, the embodiment described above can also be applied to electronic equipment other than the projector.

What is claimed is:

1. An electronic equipment comprising:
a first case;
a second case provided with an internal part disposed between the first case and the second case; and
a side panel provided individually in side spaces defined between the first case and the second case,
wherein the side panel has a guide provided to be oriented towards the internal part and opened to penetrate in an alignment direction in which the first case, the internal part, and the second case are aligned,
wherein the first case has a first boss extending in the alignment direction and configured to be inserted to pass through the guide,
wherein the first boss is fixed to the second case, wherein the side panel has a projection projecting towards the internal component, and wherein the first boss, the projection, and the second case are fastened all together.

2. The electronic equipment according to claim 1, wherein the guide has substantially an annular shape.

3. The electronic equipment according to claim 2, wherein the first boss has an arc shape on at least a part of an outer circumferential surface of a portion thereof which is configured to be passed through the guide and is passed through the guide with a gap defined relative to the guide in a radial direction of the guide.

4. The electronic equipment according to claim 1, wherein the guide is provided at an end portion of the side panel which faces the first case in the alignment direction.

5. An electronic equipment comprising:

a first case;

a second case provided with an internal part disposed between the first case and the second case; and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, wherein the first boss is fixed to the second case, wherein the second case comprises a first engagement portion, and wherein the side panel comprises a first engagement target portion configured to be brought into engagement with the first engagement portion.

6. The electronic equipment according to claim 5, wherein the first engagement portion is provided to extend along substantially a full circumference of an outer edge portion of the second case.

7. An electronic equipment comprising:

a first case;

a second case provided with an internal part disposed between the first case and the second case; and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, wherein the first boss is fixed to the second case, wherein the side panel comprises a second engagement portion, and wherein the first case comprises a second engagement target portion configured to be brought into engagement with the second engagement portion.

8. The electronic equipment according to claim 7, wherein the guide is provided in such a manner as to be connected integrally with the second engagement portion, and wherein the first boss is provided in such a manner as to be connected integrally with the second engagement target portion.

9. The electronic equipment according to claim 7, wherein the second engagement target portion is provided to extend along substantially a full circumference of an outer edge portion of the first case.

10. An electronic equipment comprising:

a first case;

a second case provided with an internal part disposed between the first case and the second case; and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, wherein the first boss is fixed to the second case, and wherein the guide comprises a hook configured to hold a wiring of the internal part.

11. An electronic equipment comprising:

a first case;

a second case provided with an internal part disposed between the first case and the second case; and a side panel provided individually in side spaces defined between the first case and the second case, wherein the side panel has a guide provided to be oriented towards the internal part and opened to penetrate in an alignment direction in which the first case, the internal part, and the second case are aligned, wherein the first case has a first boss extending in the alignment direction and configured to be inserted to pass through the guide, wherein the first boss is fixed to the second case, and wherein a projection port opening is provided in the side panel, and the guide is provided to be disposed so as not to interfere with the internal part, thereby constituting a projector.

\* \* \* \* \*